(12) United States Patent
Frauenkron et al.

(10) Patent No.: US 8,868,318 B2
(45) Date of Patent: Oct. 21, 2014

(54) METHOD FOR OPERATING AN INTERNAL COMBUSTION ENGINE USING EXTERNALLY SUPPLIED IGNITION

(75) Inventors: Helge Frauenkron, Markgroeningen (DE); Robert Kuenne, Bretzfeld (DE)

(73) Assignee: Robert Bosch GmbH, Stuttgart (DE)

( * ) Notice: Subject to any disclaimer, the term of this patent is extended or adjusted under 35 U.S.C. 154(b) by 1360 days.

(21) Appl. No.: 12/326,548

(22) Filed: Dec. 2, 2008

(65) Prior Publication Data
US 2009/0157270 A1 Jun. 18, 2009

(30) Foreign Application Priority Data

Dec. 14, 2007 (DE) .......................... 10 2007 060 216

(51) Int. Cl.
| | | |
|---|---|---|
| F02D 41/30 | (2006.01) | |
| F02D 41/02 | (2006.01) | |
| F02P 5/14 | (2006.01) | |
| F02P 5/04 | (2006.01) | |
| F02D 41/00 | (2006.01) | |
| F02P 5/152 | (2006.01) | |
| F02B 37/22 | (2006.01) | |

(52) U.S. Cl.
CPC .............. *F02D 41/023* (2013.01); *F02P 5/142* (2013.01); *F02P 5/04* (2013.01); *F02B 37/22* (2013.01); *F02D 41/0007* (2013.01); *F02D 2250/21* (2013.01); *F02P 5/1521* (2013.01); *Y02T 10/46* (2013.01); *Y02T 10/144* (2013.01)
USPC .............................. 701/105; 104/103; 104/86

(58) Field of Classification Search
CPC ................. F02B 37/22; F02D 2009/00; F02D 2009/0238; F02D 2009/0298; F02D 2200/0618; F02D 2200/10; F02D 2200/1002; F02D 2200/1004; F02D 2200/1006; F02D 2200/101; F02D 2200/1012; F02D 2200/606; F02D 2250/18; F02D 2250/21; F02D 35/0046; F02D 35/0092; F02D 37/00; F02D 37/02; F02D 41/00; F02D 41/0007; F02D 41/02; F02D 41/0205; F02D 41/021; F02D 41/0215; F02D 41/0225; F02D 41/023; F02D 41/30; F02D 41/3005; F02D 41/3011; F02D 41/3064; F02D 41/307; F02D 41/34; F02D 41/345; F02D 41/40; F02D 43/00; F02D 45/00; F02P 5/00; F02P 5/04; F02P 5/045; F02P 5/06; F02P 5/142; F02P 5/145; F02P 5/1455; F02P 5/1502; F02P 5/1504; F02P 5/151; F02P 5/1518; F02P 5/1521; F02P 5/1528; Y02T 10/144; Y02T 10/46
USPC ..................... 701/51, 54, 85, 110, 58, 64, 66, 701/103–105, 108, 84, 86–87; 477/101, 477/102, 107, 109
See application file for complete search history.

(56) References Cited

U.S. PATENT DOCUMENTS

2004/0106498 A1* 6/2004 Badillo et al. ................ 477/109

* cited by examiner

*Primary Examiner* — Jerrah Edwards
(74) *Attorney, Agent, or Firm* — Kenyon & Kenyon LLP

(57) ABSTRACT

A method for operating an internal combustion engine using externally supplied ignition, having a manually operable transmission, in which a torque produced by the internal combustion engine is able to be influenced via at least one control variable. An impending shifting process of the manual transmission and/or another operating situation of the internal combustion engine, during which a temporary lowering of the torque produced by the internal combustion engine is required and/or desired, is detected, and, as a function of the detection, the torque is lowered by changing at least one control variable of a fuel path.

18 Claims, 2 Drawing Sheets

METHOD FOR OPERATING AN INTERNAL COMBUSTION ENGINE USING EXTERNALLY SUPPLIED IGNITION

FIELD OF THE INVENTION

The present invention relates to a method for operating an internal combustion engine using externally supplied ignition, having a manually operable transmission, in which a torque produced by the internal combustion engine is able to be influenced via at least one control variable.

The present invention also relates to a control unit for an internal combustion engine of a motor vehicle and a computer program for such a control unit.

BACKGROUND INFORMATION

The usual operating methods for internal combustion engines using externally supplied ignition usually provide the operating of a throttle valve, in order to adjust an air mass flow supplied to the internal combustion engine, and thereby to set the torque produced by the internal combustion engine. In the usual systems, for example, the throttle valve is always at least partially closed when, with the aid of an accelerator sensor, a torque command by the driver has been ascertained that is reduced compared to an earlier value.

This known control via the air path of the internal combustion engine has the important disadvantage that it is comparatively slow, so that a dynamic operation of the internal combustion engine is only still possible in a very restricted manner. Especially when exhaust-gas turbochargers are used, the air mass flow that is reduced by the throttle valve acts negatively on the dynamic operating performance, because the turbine of the exhaust-gas turbocharger first has to be accelerated again to its nominal rotational speed after a throttling. This effect, known also as a "turbo hole", comes about because of the insufficient usual control methods not only in response to an acceleration of the internal combustion engine from its idling speed, but also in all other operating ranges, in which the internal combustion engine is to be accelerated again shortly after a reduction in the torque command.

SUMMARY OF THE INVENTION

Accordingly, it is an object of the present invention to provide an operating method, a control unit and a computer program with a view to improving the dynamic response of the internal combustion engine.

This object is attained, according to the present invention, with respect to the operating method, in that an impending shifting process of the manual transmission and/or another type of operating situation of the internal combustion engine, during which a temporary lowering in the torque produced by the internal combustion engine is required and/or desired, is detected, and the torque is reduced as a function of the detection by changing at least one control variable of a fuel path.

The detection, according to the present invention, of such a special operating situation, in which the torque is to be reduced only intermittently, and in which subsequently, as a rule, a renewed acceleration is to take place, advantageously makes possible the targeted, rapid lowering in the torque via the fuel path, and enables avoiding operation of the throttle valve, which led to the restriction in the dynamics mentioned at the outset.

The desired torque of the internal combustion engine is able to be set faster via the fuel path than via the usual throttling, so that, on the one hand, a rapid reduction in the torque is possible in response to a detected shifting process. On the other hand, the temporary lowering of the torque may also be reversed again more rapidly, in response to a shifting process, or the like, detected according to the present invention while using control variables of the fuel path, than is possible in the usual operating methods, which first have to reopen a previously at least partially closed throttle valve, for this purpose.

The principle according to the present invention is quite especially advantageously applied in the case of internal combustion engines having an exhaust-gas turbocharger, because, on account of the lowering of the torque via the fuel path, according to the present invention, the air mass flow, which is used at the output end of the internal combustion engine to drive the exhaust-gas turbocharger, is not impaired. This means that the so-called "turbo hole" is prevented when using the method according to the present invention.

Even for internal combustion engines that are not pressure-charged, the operating method according to the present invention ensures optimal dynamics and performance of the internal combustion engine after a temporary lowering in the torque, as comes about, for instance, in response to the manual operation of the manual transmission during the disengaging of the clutch, because an existing intake manifold pressure is not reduced by a throttle valve setting.

Even a brief reduction in the driver's torque command without a shifting process, which occurs, for example, in response to a dynamic cornering, is detected by the method according to the present invention, so that a usual air path-controlled lowering in the torque, for instance, using the throttle valve setting, may be avoided here too, and a maximum power of the internal combustion engine for the subsequent acceleration process can be provided.

For the temporary lowering in torque in response to an impending shifting process, the ignition angle may be advantageously changed, according to the present invention, and/or a fuel injection for at least one cylinder of the internal combustion engine may be deactivated.

According to one advantageous specific embodiment, maximum dynamics in the operation of the internal combustion engine exist if the lowering in the torque is implemented exclusively via control variables of the fuel path, that is, no additional control variables of the air path are used to lower the torque.

According to the present invention, it may rather even be provided that one or more control variables of the air path are changed, preferably in parallel to the fuel path-based lowering in the torque, or shortly thereafter, in order to maximize the intake manifold pressure, whereby optimal performance of the internal combustion engine for a subsequent acceleration process is ensured.

Of particular importance is the implementation of the method according to the present invention in the form of a computer program which is able to be run on a computer or a processing unit of a control device, and which is suitable for executing the method. The computer program may be stored on an electronic storage medium, for example, the storage medium in turn being part of the control device, for example.

DETAILED DESCRIPTION

Figure 1:
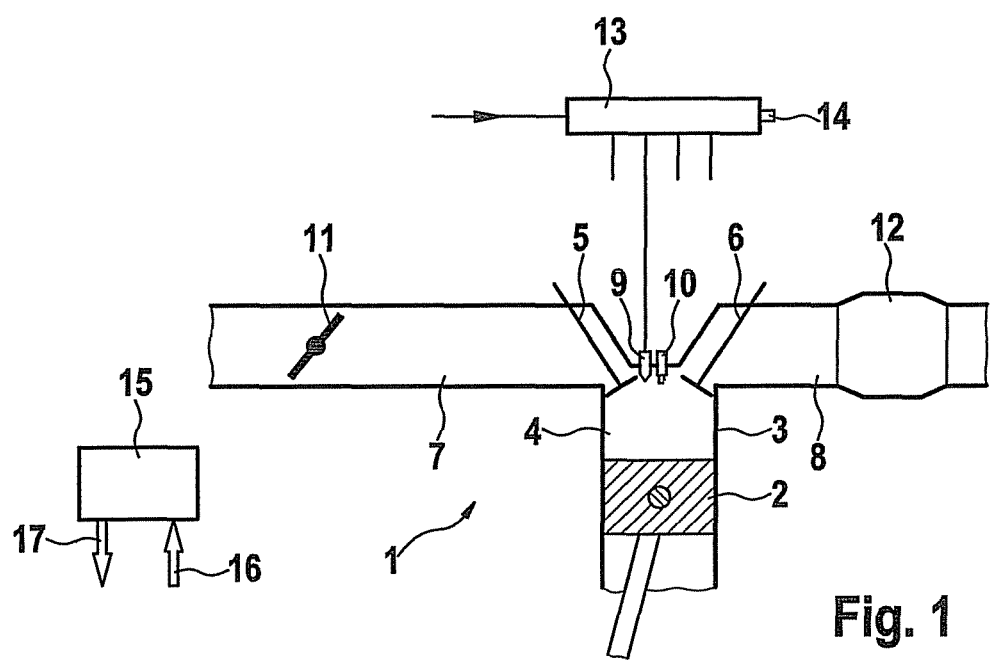
FIG. 1 shows a schematic block diagram of an internal combustion engine according to the present invention.

FIG. 1 shows an internal combustion engine 1 of a motor vehicle, using externally supplied ignition, in which a piston 2 is able to be moved back and forth in a cylinder 3. Cylinder 3 is equipped with a combustion chamber 4, which, among other things, is delimited by piston 2, an intake valve 5 and an exhaust valve 6. An intake manifold 7 is connected to intake valve 5, and an exhaust pipe 8 is connected to exhaust valve 6.

In the region of intake valve 5 and exhaust valve 6, fuel injector 9 extends into combustion chamber 4, via which fuel is able to be injected into combustion chamber 4. A spark plug 10 is also situated in this region of combustion chamber 4.

For the control of an air mass flow supplied to internal combustion engine 1, a throttle valve 11 is provided in intake manifold 7. A catalytic converter 12 is accommodated in exhaust pipe 8 to purify the exhaust gases created by the combustion of fuel. An exhaust-gas turbocharger that is not shown may be assigned to internal combustion engine 1.

Fuel injector 9 is connected to a fuel accumulator 13 via a pressure line. The fuel injectors of the other cylinders of internal combustion engine 1 are likewise connected to fuel accumulator 13 in a corresponding manner. Fuel accumulator 13 is supplied with fuel via a supply line. A preferably mechanical fuel pump, which is suitable for generating the desired pressure in fuel accumulator 13, is provided for this purpose.

Furthermore, a pressure sensor 14 by which the pressure in fuel accumulator 13 is able to be measured, is also arranged at fuel accumulator 13. This pressure is the pressure exerted on the fuel and which is therefore used to inject the fuel into combustion chamber 4 of internal combustion engine 1 via fuel injector 9. During operation of internal combustion engine 1, fuel is conveyed into fuel accumulator 13. This fuel is injected into associated combustion chambers 4 via fuel injectors 9 of the individual cylinders 3, and is ignited using spark plugs 10. Pistons 2 will be put into back and forth motion by the combustion of the air/fuel mixture prevailing in combustion chambers 4. These movements are transmitted to a crankshaft (not shown) and exert a torque on it.

A manual transmission (not shown) is assigned to internal combustion engine 1.

A control unit 15 receives input signals 16, which represent operating variables of internal combustion engine 1 measured by sensors. For instance, control unit 15 is connected to pressure sensor 14, an air-mass sensor, an engine-speed sensor and the like. Moreover, control unit 15 is connected to an accelerator sensor, which generates a signal indicating the setting of a driver-operable accelerator and thereby indicates the torque that is called for, that is also known as the driver's torque command. Control unit 15 generates output signals 17 by which the performance of internal combustion engine 1 may be influenced via actuators or setters. For example, control unit 15 is connected to fuel injector 9 and the like and generates the signals required for their triggering.

Among other things, control unit 15 is provided to control and/or regulate the operating variables of internal combustion engine 1. For example, the fuel mass injected into combustion chamber 4 by fuel injector 9 is controlled and/or regulated by control unit 15 in particular with respect to low fuel consumption and/or low pollutant generation. To this end, control unit 15 is equipped with a microprocessor, which has a computer program stored in a storage medium, in particular a flash memory that is suitable to execute the control and/or regulation mentioned.

According to the present invention, an impending shifting process of the manual transmission and/or another operating situation of internal combustion engine 1, during which a temporary lowering of the torque produced by internal combustion engine 1 is required and/or desired, is detected, and, as a function of the detection, the torque is lowered by changing at least one control variable of a fuel path.

It is thereby advantageously avoided having to use control variables of an air path, such as the throttle valve setting, etc., for the intermittent lowering of the torque. Furthermore, it is ensured by the detection, according to the present invention, of the impending shifting process, that the special lowering in the torque according to the present invention, which preferably takes place exclusively via the fuel path, is not carried out in other operating situations, in which, for example, a durable lowering in the torque is desired. In these other operating situations, the operating method according to the present invention is not carried out further, and the lowering in the torque may usually be carried out via a throttling of the air mass flow, using a throttle valve 11.

The operating method according to the present invention may be used especially advantageously to implement an operating manner of internal combustion engine 1 that is also designated as "sport upshift". In sport upshift it is quite essential that the torque of internal combustion engine 1, during manual upshift from one gear to the next higher gear of the manual transmission, is in each case only briefly lowered when the clutch is disengaged. As soon as the next higher gear is engaged by the driver and the clutch is engaged again, the maximum power of internal combustion engine 1 should be immediately available for a further acceleration process.

This is achieved according to the present invention in that the brief lowering of the torque for the manual upshift takes place by influencing the rapid fuel path, in particular, an ignition angle being able to be changed. Alternatively or in addition, fuel injection into one or more cylinders 3 of internal combustion engine 1 may also be deactivated. The slow air path is preferably not modified for the implementation of sport upshift. In particular, no throttling of the air mass flow in intake manifold 7 is undertaken.

Figure 2:
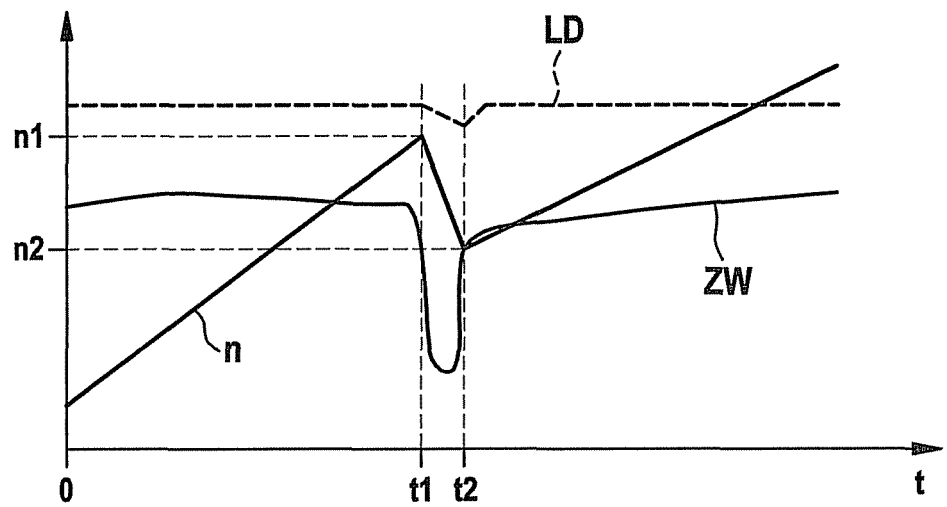
FIG. 2 shows a curve over time of operating variables of the internal combustion engine in a first specific embodiment of the method according to the present invention.

FIG. 2 shows the curve over time of some operating variables of internal combustion engine 1 in a manually performed shifting process while using the method according to the present invention.

In this case, as may be seen from the continuously rising speed n from t=0 to time t1, internal combustion engine 1 is accelerated by specifying a corresponding driver torque command. At time t1 a shifting process is started, which altogether lasts up to time t2, and which includes a manual upshift of the manual transmission assigned to internal combustion engine 1. As of time t2, internal combustion engine 1 is further accelerated using the newly engaged gear.

According to the present invention, the shifting process is detected at time t1, and ignition angle ZW is changed in the interval (t1; t2), as may be seen in FIG. 2, and is especially retarded, in order to lower the torque produced by internal combustion engine 1, so that speed n does not increase during the upshifting. Rather, on account of the manipulation, according to the present invention, of ignition angle ZW, speed n may become, from the value n1 reached at time t1 more like value n2, which sets in when the next highest gear is engaged.

Because the method according to the present invention sets the lowering in the torque via the fuel path, predominantly by the retardation of ignition angle ZW, and leaves the control variables of the air path essentially unchanged, the boost pressure LD, generated by the exhaust-gas turbocharger (not shown) in intake manifold 7, remains essentially the same over the entire shifting process, or rather, is lowered only slightly, which, among other things, is connected to lowered speed n.

In a usual operating method without the detection, according to the present invention, of the operating type "sport upshift", in order to lower the torque as of time t1, throttle valve 11 would have been at least partially closed, whereby, among other things, a reduction in the turbine rotational speed of the exhaust-gas turbocharger would have occurred, and with that, a substantially greater lowering of boost pressure LD. This lowering of the boost pressure would further have led to the maximum power or the maximum torque not being present also for the additional acceleration of internal combustion engine 1 as of time t2 of the clutch engagement.

By contrast to this, when using the method according to the present invention having an unthrottled air mass flow, a maximum torque of internal combustion engine 1 may be retrieved directly as of time t2 of the clutch engagement. For this, one has only to reset the ignition angle from the temporarily lowered value to a suitable higher value or to deactivate a possibly used fuel-injection blank-out.

The operating method according to the present invention may be used advantageously in all operating situations in which a brief lowering in torque is desired or required, and in which subsequently a maximum torque should be able to be briefly retrieved again. Besides the "sport upshift", a dynamic cornering comes into consideration here, in which the driver of the motor vehicle frequently briefly takes his foot off the accelerator before the curves, so as to continue to accelerate in or past the curves. In this application case, too, the usual throttle valve-based lowering in torque would slow down the response of the internal combustion engine and impair a highly dynamic operation.

The detection, according to the present invention, of the impending shifting process or a desired "sport upshifting" may, for instance, be derived from the signal of a clutch switch. Alternatively or in supplementation, a curve over time of the driver's torque command or of the accelerator sensor may also be analyzed.

It is also conceivable to use the method according to the present invention in the case of automated manual transmissions. In this case, information concerning the shifting process may be transmitted directly from a control unit of the automated manual transmission to control unit 15 of internal combustion engine 1, According to the present invention, besides the above-described detection as to whether a shifting process or the desire for "sport upshifting" exists, one or more additional activation criteria may be checked which, for instance, include the following conditions:

checking the activation of a "sport mode", if it is provided in the motor vehicle containing internal combustion engine 1;

rotational speed n of internal combustion engine 1 at time t1 (FIG. 2), at which the clutch is activated, lies in the area of the optimal shifting point which, if necessary, may also be signaled to the driver over a separate indication;

rotational speed n of internal combustion engine 1 at time t1 (FIG. 2) at which the clutch is activated, lies in the area of the admissible maximum speed;

up to time t1 (FIG. 2), at which the clutch is activated, all the way over a specifiable waiting period, a specifiable threshold value for the driver's torque command has been exceeded or the maximum driver's torque has been set;

the absolute value of the derivation with respect to time of the signal of the accelerator sensor exceeds a specifiable threshold value;

the occurrence of an adherence interruption, particularly by disengaging the clutch, and simultaneously the exceeding of a specifiable threshold value for the driver's torque command.

According to the present invention, besides the above-described activation conditions, one or more deactivation criteria may also be checked which prohibit carrying out the method according to the present invention, and which include, for instance, the following conditions:

operating a brake pedal;

operating the clutch pedal exceeds a specifiable, maximum duration;

the time in which the signal of the accelerator sensor falls below a specifiable threshold value exceeds a specifiable minimum duration;

an exhaust gas temperature that is ascertained, for instance, by measuring or is model-based, in the region of the exhaust-gas turbocharger and/or catalytic converter 12 exceeds a specifiable maximum value.

If one or more of the above-mentioned deactivation conditions are present, the method according to the present invention is not carried out or broken off. In particular, even after a detection that has first taken place, of "sport upshifting" or a comparable operating situation, the further carrying out of the method is prevented and, for instance, throttling the air mass flow in intake manifold 7 using throttle valve 11 is admissible.

In an additional very advantageous variant of the present invention, it may be provided that one should maximize the intake manifold pressure by changing one or more control variables of the air path. It is ensured thereby that a maximum torque of internal combustion engine 1 is available after the end of the temporary lowering of the torque. This modification of the air path should be coordinated with the lowering in torque according to the present invention via the fuel path in such a way that the requested temporary lowering in torque is safely attained. The modification of the air path may, for instance, take place only shortly after the initiation of the lowering in torque via the fuel path.

Alternatively, it is also possible to leave setpoint values for the control variable(s) of the air path constant during the "sport upshift".

In addition, it may also be provided that the setpoint values for the control variables of the air path are submitted to low-pass filtering during the "sport upshift", in particular, a first filter time constant being specified for a first filter time interval; and for a second filter time interval, that follows the first filter time interval, a second filter time constant being specified that is lower than the first filter time constant.

This variation of the present invention is described below in greater detail, with reference to FIG. 3.

Figure 3:
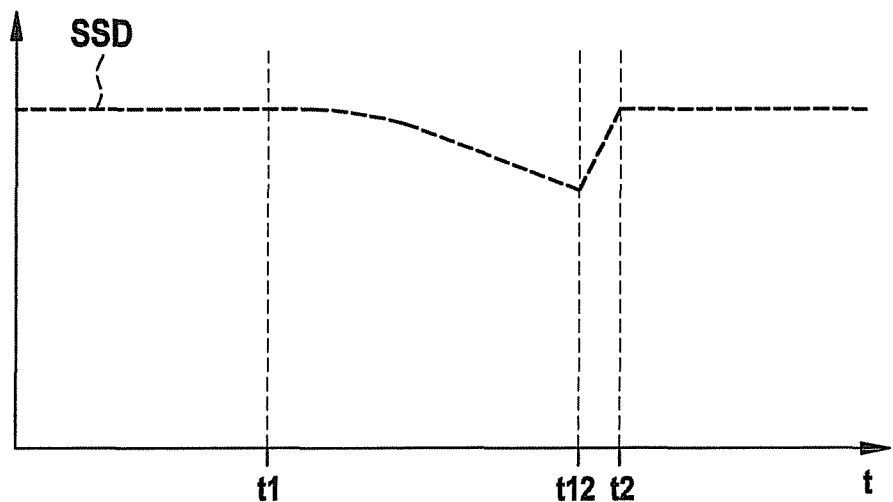
FIG. 3 shows a curve over time of operating variables of the internal combustion engine in a second specific embodiment of the method according to the present invention.

Up to time t1, internal combustion engine 1 is operated as usual, thereby yielding the curve over time, shown in FIG. 3, of a setpoint value SSD for the intake manifold pressure which, for example, is a function of the driver's torque command and other operating variables of internal combustion engine 1.

Beginning at time t1, it is detected, for instance, while using the above-described activation criteria according to the present invention, that a "sport upshift" is present. Accordingly, the setpoint intake manifold pressure SSD is now submitted to a low-pass filtering having a comparatively large filter time constant, in order to prevent the setpoint intake manifold pressure SSD, starting from the value before the "sport upshift", from changing too rapidly to smaller values, as would be the case in a usual engine control for lowering the torque. Such a change would, as is known, result in a starting throttling using threshold value 11 which, according to the present invention, is to be prevented, in order not unnecessarily to restrict the dynamics of internal combustion engine 1 during the "sport upshift".

As soon as the "sport upshift" is finished or even before that, at time t12, a second, smaller filter time constant for the low-pass filtering of setpoint intake manifold pressure SSD may be specified, in order to make possible, after the "sport upshift", a faster adjustment to the currently calculated setpoint value for the operation after the "sport upshift", and especially to avoid a sudden change in setpoint intake manifold pressure SSD.

Thereafter, the low-pass filtering according to the present invention may be deactivated, so that setpoint intake manifold pressure SSD assumes its usual characteristics again.

In pressure-charged internal combustion engines, analogously to the above-described filtering of setpoint intake manifold pressure SSD, the setpoint boost pressure (not shown) may also be modified.

In the case of pressure-charged internal combustion engines, a pop-off valve of the exhaust-gas turbocharger or the like may preferably be held closed, when the "sport upshift" according to the present invention has been detected, in order not to cause any sudden drop in the boost pressure or the intake manifold pressure. As a safety measure, a maximum time duration may also advantageously be specified during which the pop-off valve is allowed to be held closed.

If a turbo supercharger having a variable turbine geometry (VTG) is associated with internal combustion engine 1, instead of a usual boost pressure regulation, according to the present invention, one may also have a special setting for the boost pressure and the turbine geometry in such a way that it is particularly a function of the gear of the manual transmission that is to be changed and/or a rotational speed n of internal combustion engine 1. The curve over time for the influencing of the turbine geometry during shifting is selected especially so that the boost pressure remains at a maximum, in spite of a speed-dependent air mass flow that decreases during the shifting process, and in spite of an exhaust gas temperature that is changing.

As a function of the expected lowering in the rotational speed because of the shifting process or the expected rotational speed n after the end of the shifting process, a precontrol of the turbine geometry may also take place that is selected so that the turbine efficiency is an optimum at rotational speed n after the end of the shifting process.

Furthermore, it is possible to change the turbine geometry during the shifting process in such a way that an exhaust-gas back pressure is increased in a specified manner. The torque of internal combustion engine 1 is thereby reduced, based on the greater residual gas amount in combustion chamber 4. The exhaust gas back pressure built up during the shifting process corresponds, at the same time, to an increased enthalpy, whereby the speed and the boost pressure of the turbo supercharger are increased.

The boost pressure regulation according to the present invention may also advantageously be used on pressure-charged internal combustion engines having a twin-clutch transmission or sequential manual transmissions, and it ensures a maximum boost pressure after the gear change.

As a function of the expected lowering in the rotational speed by the shifting process and the expected rotational speed n after the end of the shifting process, a precontrol of a waste gate or generally a boost pressure regulation of a turbo supercharger may advantageously also take place in such a way that, after the end of the shifting process, the turbo supercharger is operated at its maximum efficiency, so that a renewed boost pressure buildup is able to take place particularly rapidly.

What is claimed is:

1. A method for operating an internal combustion engine using externally supplied ignition, having a manually operable transmission, the method comprising:
   influencing a torque produced by the internal combustion engine via at least one control variable;
   detecting at least one of (a) an impending shifting process of the manual transmission and (b) another operating situation of the internal combustion engine, during which a temporary lowering of the torque produced by the internal combustion engine is required or desired;
   lowering, as a function of the detection, the torque by changing at least one control variable of a fuel path; and
   holding setpoint values of control variables of an air path, except an air charge and a boost pressure, constant from a point of the detection till a point of determination of a completion of the shifting process of the manual transmission.

2. The method according to claim 1, further comprising:
   changing an ignition timing in order to reduce the torque.

3. The method according to claim 1, further comprising:
   deactivating a fuel injection for at least one cylinder of the internal combustion engine, in order to reduce the torque.

4. The method according to claim 1, wherein the lowering of the torque is only adjusted via the fuel path.

5. The method according to claim 1, further comprising:
   changing, as a function of the determination, at least one control variable of an air path in order to maximize an intake manifold pressure.

6. The method according to claim 1, wherein a setpoint value for a control variable of an air path, for at least one of an air charge and a boost pressure in the case of a pressure-charged internal combustion engine, during the shifting process or during the another operating situation is submitted to a low-pass filtering, wherein for a first filter time interval, a first filter time constant is specified, and wherein for a second filter time interval that is subsequent to the first filter time interval, a second filter time constant is specified that is lower than the first filter time constant.

7. The method according to claim 1, further comprising:
   checking at least one of (a) activation conditions and (b) deactivation conditions, additionally to the detection of an impending shifting process or of the another operating situation; and
   controlling a further operation of the internal combustion engine as a function of a presence or non-presence of respective conditions.

8. A non-transitory computer-readable medium having a computer program, which is executable by a processor, comprising:
   a program code arrangement having program code for operating an internal combustion engine using externally supplied ignition, having a manually operable transmission by performing the following:
   influencing a torque produced by the internal combustion engine via at least one control variable;
   detecting at least one of (a) an impending shifting process of the manual transmission and (b) another operating situation of the internal combustion engine, during which a temporary lowering of the torque produced by the internal combustion engine is required or desired;

lowering, as a function of the detection, the torque by changing at least one control variable of a fuel path; and holding setpoint values of control variables of an air path, except an air charge and a boost pressure, constant from a point of the detection till a point of determination of a completion of the shifting process of the manual transmission.

9. A control device for operating an internal combustion engine of a motor vehicle using externally supplied ignition, having a manually operable transmission, comprising:

an arrangement for influencing a torque produced by the internal combustion engine via at least one control variable;

an arrangement for detecting at least one of (a) an impending shifting process of the manual transmission and (b) another operating situation of the internal combustion engine, during which a temporary lowering of the torque produced by the internal combustion engine is required or desired;

an arrangement for lowering, as a function of the detection, the torque by changing at least one control variable of a fuel path; and a holding arrangement to hold setpoint values of control variables of an air path, except an air charge and a boost pressure, constant from a point of the detection till a point of determination of a completion of the shifting process of the manual transmission.

10. The method according to claim 1, further comprising:
changing an ignition timing to reduce the torque;
wherein the lowering of the torque is only adjusted via the fuel path.

11. The method according to claim 10, further comprising:
changing, as a function of the determination, at least one control variable of an air path to maximize an intake manifold pressure.

12. The method according to claim 1, further comprising:
deactivating a fuel injection for at least one cylinder of the internal combustion engine, in order to reduce the torque, wherein the lowering of the torque is only adjusted via the fuel path.

13. The method according to claim 12, further comprising:
changing, as a function of the determination, at least one control variable of an air path to maximize an intake manifold pressure.

14. The method according to claim 1, further comprising:
changing an ignition timing to reduce the torque, wherein the lowering of the torque is only adjusted via the fuel path;
changing, as a function of the determination, at least one control variable of an air path to maximize an intake manifold pressure; and
deactivating a fuel injection for at least one cylinder of the internal combustion engine, to reduce the torque, wherein the lowering of the torque is only adjusted via the fuel path.

15. The method according to claim 1, further comprising:
changing an ignition timing in order to reduce the torque;
deactivating a fuel injection for at least one cylinder of the internal combustion engine to reduce the torque.

16. The method according to claim 15, further comprising:
changing, as a function of the determination, at least one control variable of an air path in order to maximize an intake manifold pressure;
wherein the lowering of the torque is only adjusted via the fuel path.

17. The method according to claim 15, wherein a setpoint value for a control variable of an air path, for at least one of an air charge and a boost pressure in the case of a pressure-charged internal combustion engine, during the shifting process or during the another operating situation is submitted to a low-pass filtering, wherein for a first filter time interval, a first filter time constant is specified, and wherein for a second filter time interval that is subsequent to the first filter time interval, a second filter time constant is specified that is lower than the first filter time constant.

18. The method according to claim 15, further comprising:
checking at least one of (a) activation conditions and (b) deactivation conditions, additionally to the detection of an impending shifting process or of the another operating situation; and
controlling a further operation of the internal combustion engine as a function of a presence or non-presence of respective conditions.

* * * * *